United States Patent Office 2,706,891
Patented Apr. 26, 1955

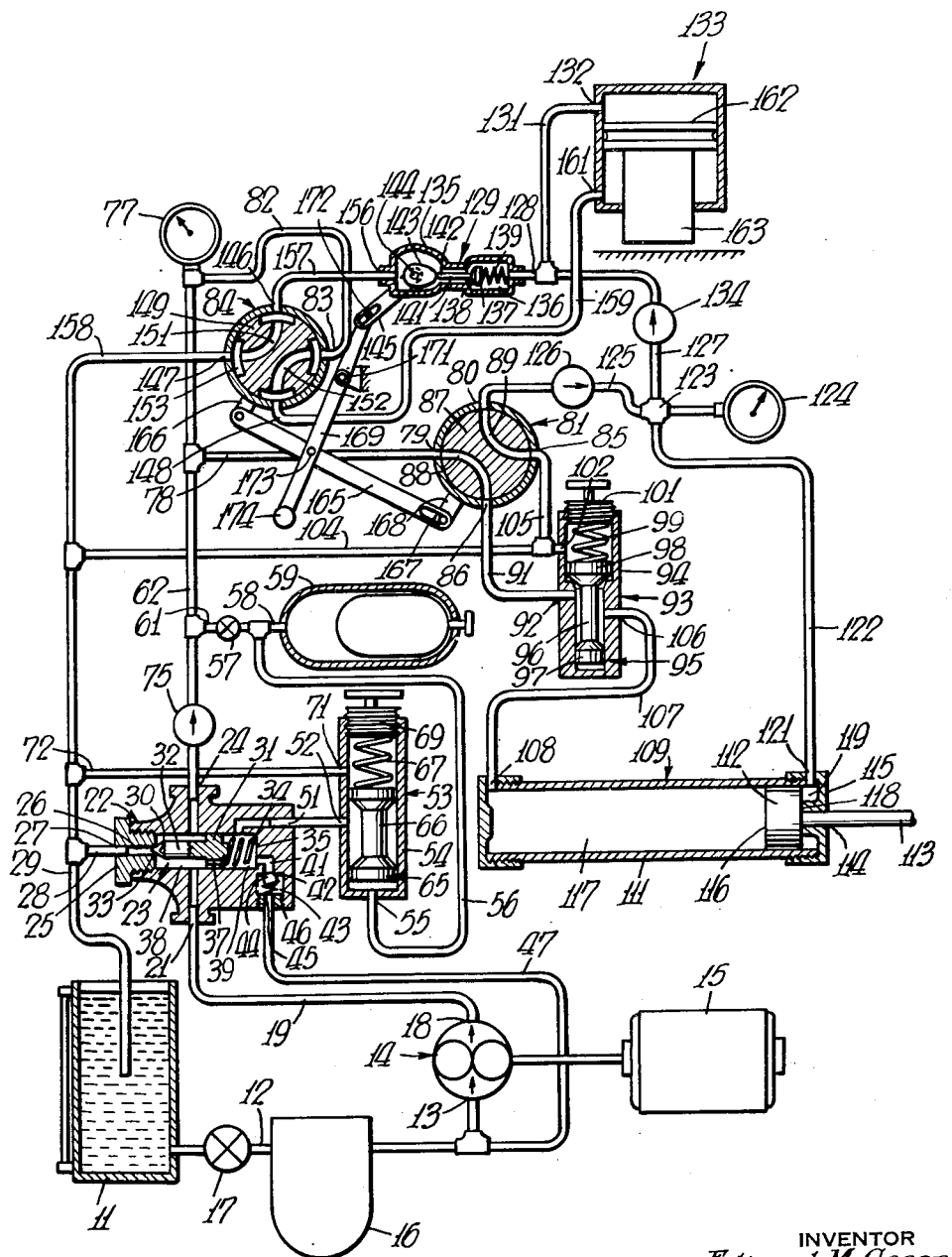

2,706,891

PRESSURE INTENSIFIER SYSTEM

Edward M. Greer, Great Neck, N. Y., assignor to Greer Hydraulics, Inc., a corporation of New York Application May 31, 1952, Serial No. 291,015

2 Claims. (Cl. 60—52)

It is among the objects of the invention to provide a hydraulic circuit which will furnish a relatively low pressure from a low pressure source to bring the movable member of a hydraulically operated unit to one position, and will provide a relatively high pressure from such low pressure source to move said movable member to a second position, which circuit is relatively simple and not likely to become deranged and in which both the low pressure and high pressure from such low pressure source may readily be controlled.

This application is a continuation-in-part of copending application Serial No. 678,533 filed June 22, 1946, now abandoned.

In the accompanying drawing in which is shown one or more of various possible embodiments of the several features of the invention, the single figure is a circuit diagram of the equipment.

Referring now to the drawing, the system desirably comprises a reservoir 11 connected by line 12 to the inlet 13 of a fluid pump 14 desirably driven by a motor 15, a filter 16 and a control valve 17 being connected in line 12. The output 18 of the pump 14 is connected by line 19 to the input 21 of an unloader valve 22, desirably of the type put out by Vickers, Inc. The valve 22 desirably has a bore 23 therein in communication with inlet 21, and the outlet 24 of valve 22 is also in communication with said bore 23.

The bore 23 desirably has a plug 25 affixed in its open end, said plug having a bore 26 therethrough with its outlet 27 connected by line 28 to a return line 29 which is connected to reservoir 11. Slidably mounted in the bore 23 of valve 22 is a piston 31 having an axial stem 32 rigid therewith defining a valve head 30 at its end adapted to seat in the inner end 33 of bore 26 to seal the latter, a coil spring 34 compressed between the end 35 of bore 23 and the piston 31 normally retaining said valve head 30 on its seat.

The piston 31 desirably has a bore 37 therethrough providing communication between the chambers 38 and 39 on each side of piston 31 respectively. Chamber 39 desirably has a passageway 41 leading thereinto, which has its outlet end 42 leading into a cavity 43 in said valve. Outlet 42 normally is closed by a ball 44 retained on its seat by a coil spring 45 compressed between the ball and a plug 46, which has a bore therethrough connected by line 47 to the inlet 13 of pump 14. The chamber 39 has a second passageway 51 leading thereinto, the outlet end of which is connected to port 52 of variable pressure relief valve 53.

The valve 53 desirably comprises a cylindrical casing 54 having a port 55 in one end thereof connected by line 56 to the inlet 58 of a standard pressure accumulator 59, and through valve 57 by line 61 to feed line 62. Slidably mounted in cylinder 54 is a piston 65 which desirably is of reduced diameter at its mid-portion as at 66. The length of said reduced diameter portion 66 is such that when the piston is moved in cylinder 54 against the tension of coil spring 67, which is compressed between the end of the piston and an adjustment plug 69 screwed in the threaded end of the cylinder, communication will be afforded between ports 52 and 71 in said cylinder, the latter port being connected by line 72 to return line 29.

The outlet port 24 of valve 22 to which feed line 62 is connected, has a check valve 75 therein which permits flow of fluid only from the port 24 through the line 62. The line 62 which has a pressure guage 77 connected thereto, is connected by line 78 to inlet port 79 of rotary valve 81, and by line 82 to inlet port 83 of rotary valve 84. In addition to port 79, valve 81 has three additional ports, 80, 85 and 86, said ports being spaced 90 degrees apart. The valve 81 has a rotary member 87 with passageway 88 and 89 therethrough, which in one position of the rotary member 87 will connect ports 79 and 86, and ports 80 and 85, and in the second position of the rotary member will connect ports 79 and 80 and ports 85 and 86.

The port 86 of valve 81 is connected by line 91 to port 92 of a second variable pressure relief valve 93, which is substantially identical to valve 53, and desirably has a cylindrical casing 94 in which a piston 95 is slidably mounted. The piston 95 is of desirably reduced diameter at its mid-portion as at 96, defining ends 97 and 98, the latter being of greater diameter than the former. The length of said reduced portion 96 is such that when the piston 95 is moved in cylinder 94 against the tension of coil spring 99 compressed between the end 98 of the piston 95 and a plug 101 screwed in the end of the cylinder, communication will be afforded between port 92 and a port 102 in cylinder 94. The port 102 is desirably connected by line 104 to return line 29 and by line 105 to port 85 of valve 81. The cylinder 94 has a third port 106 which is connected by line 107 to a port 108 in a pressure booster unit 109. The booster unit 109 desirably comprises a cylinder 111 in which a piston 112 having an axial piston rod 113 of reduced diameter is slidably mounted, the free end of said piston extending through an opening 114 in the end 115 of the cylinder. The area of the end 116 of piston 112 in chamber 117 of cylinder 111 to the left of piston 112 is greater than the area of the end 118 of piston 112 in chamber 119 of cylinder 111 to the right of the piston.

The cylinder 111 has a second port 121 in communication with the chamber 119 and connected by line 122 to a junction 123 to which a pressure guage 124 is connected. Also connected at one end to junction 123 is a line 125, the other end of which is connected to port 80 of valve 81. Desirably, a check valve 126 is connected in line 125 to permit flow of fluid from port 80 to the junction 123. In addition, a line 127 is connected at one end to junction 123 and at its other end to the inlet 128 of a check valve 129, and also by line 131 to the port 132 of a hydraulic unit, illustratively a press 133. As shown, the line 127 has a check valve 134 therein to permit flow of fluid from the junction 123 to the port 132.

The valve 129 desirably comprises a casing 135 having a bore 136 therethrough. Slidably mounted in said bore is a valve head 137 normally urged toward its seat 138 by a coil spring 139. The valve head 137 desirably has a stem 141, the inner end 142 of which is engaged by a cam 143 affixed to a shaft 144. The cam 143 which is controlled by a handle 145 is so designed that in one position in which its high portion engages end 142 it will retain the valve head 137 away from its seat 138 and in another position it will permit the spring 139 to seat the valve head.

The valve 84, in addition to port 83 has three additional ports, 146, 147 and 148, said ports being spaced 90 degrees apart. The valve 84 has a rotary member 149 with passageways 151 and 152 therein which are of enlarged dimensions at their ends 153. The passageways 151 and 152 are so spaced that in one position of the rotary member 149, the ports 146 and 147 and ports 83 and 148 are connected, and in a second position of said rotary member 149, the ports 147 and 148, and ports 83 and 146 are connected.

The outlet 156 of valve 129 is desirably connected by line 157 to port 146 of valve 84. The port 147 of said valve is connected by line 158 to return line 29. The port 148 of said valve is connected by line 159 to port 161 of hydraulic press 133, the ports 132 and 161 of said press being positioned on opposite sides of the piston 162 therein to which the plunger 163 of the press is connected.

Means are provided simultaneously to actuate the valves 81, 84 and 124. To this end, a bar 165 is connected at one end to a handle 166 pivotally connected to the rotatable member 149 of valve 84. The other end of bar 165 desirably has a lost motion slot 167 therein, and a handle 168 connected to the rotatable member 87 of valve 81 is connected in said slot. A lever 169 pivotally mounted as at 171 has one end pivotally connected in slot 172 in handle 145. The lever 169 is pivotally connected to bar 165 as at 173 and has a handle 174 for actuation thereof.

Operation

Assuming that the plunger 163 of the hydraulic press 133 is in the down position, having completed the application of high pressure to the work, the system is operated to lift such plunger.

To this end, the handle 174 is moved to the position shown in which ports 79 and 86 and ports 80 and 85 of valve 81 are in communication; ports 83 and 148, and ports 146 and 147 of valve 84 are in communication and the valve 129 is in open position, the cam 143 reacting against valve stem 141 to retain valve head 137 off its seat 138.

The motor 15 is energized so that pump 14 will suck fluid from reservoir 11, through open valve 17 and line 12, through filter 16 to the inlet 13 of pump 14. From the outlet 18 of said pump 14, the fluid will flow through line 19 into inlet port 21 of unloader valve 22. Fluid will then flow into bore 23 of valve 22 and thence out of outlet 24 through check valve 75, feed line 62, line 61, open valve 57 into the inlet 58 of pressure accumulator 59 to charge the latter.

Fluid under pressure will also flow through line 56 to the port 55 of relief valve 53 to react against the piston 65 therein. However, as the tension of spring 67 has been set so that a force caused by a pressure of say 1000 p. s. i. or more is required to move the piston, no movement will be imparted thereto as the pressure on the line is initially below 1000 p. s. i.

Fluid will also flow through lines 62 and 78, port 79, passageway 88, port 86, line 91, port 92 of relief valve 93, through such valve, port 106 thereof, line 107 into inlet 108 of booster unit 109. As the piston rod 113 in cylinder 111 of booster unit 109 has already been moved to its extreme position to the right, no further movement will be imparted thereto and the flow of liquid in line 107 will be stopped. The fluid under pressure from the pump will also flow through line 62 into pressure gauge 77 so that the pressure in such line will be indicated. In addition, the fluid will flow from line 62, through line 82, into port 83 of valve 84, through passageway 152, port 148, line 159 into port 161 of hydraulic press 133.

As the result of the application of the fluid under pressure to the press 133 beneath the piston 162 thereof, the latter will be raised to lift the plunger 163 away from the work. Such upward movement of piston 162 will force the fluid thereabove through line 131 into inlet 128 of valve 124, the check valve 134 preventing flow of fluid through line 127. As valve 129 is open, the fluid from line 131 will pass therethrough and through line 157 into port 146 of valve 84 and thence through passageway 151 in said valve 84, through port 147, line 158 and return line 29 back to the reservoir 11.

When the piston 162 reaches the limit of its upward movement, the flow of fluid in line 159 will stop. Due to the stoppage of flow in lines 107 and 159, the pressure in line 62 will build up and the accumulator 59 will continue to charge. As such gradually increasing pressure is applied through line 56 to port 55 of valve 53, when the pressure rises above 1000 p. s. i., the tension of spring 67 will be overcome and piston 65 will move to provide communication between ports 52 and 71. Consequently, fluid will flow from chamber 39 of valve 22 through passageway 51, ports 52 and 71, line 72, to return line 29 back to reservoir 11. As a result, the pressure in chamber 39 would drop and the force exerted in chamber 38 of valve 22 against piston 31, of greater than 1000 p. s. i. would move piston 31 to the right against the slight tension of coil spring 34 so that valve head will move off its seat 33. Consequently, the fluid under a pressure of greater than 1000 p. s. i. would discharge out of outlet 27 of valve 22 into reservoir 11, thereby dropping the pressure on the main feed line 62 to 1000 p. s. i., at which time by reason of the drop in pressure in line 56, the piston 65 would move to cut off communication between ports 52 and 71 so that the pressure in chamber 39 of valve 22 would again build up to seat valve head 30.

With the construction above described the pressure applied to pistons 112 and 162 will not rise above 1000 p. s. i. and the charged accumulator 59 will maintain this pressure.

The next step in the sequence of operations is to position the work beneath the plunger 163 and to move such plunger into engagement with such work while at the same time retracting the piston 112 and piston rod 113 in booster cylinder 111. To this end the handle 174 of lever 169 is moved to the left. As a result, the handle 145 of valve 129 is rotated so that the high point of the cam 143 is moved away from the end 142 of valve stem 141, the spring 139 thereupon moving the valve head 137 onto its seat 138 to close the valve 129. This movement of handle 174 will move bar 165 to the left and the handles 168 and 166 of valves 81 and 84 will be moved to turn the rotatable members 87 and 149 of said valves respectively in a clockwise direction until ports 79 and 80 and ports 85 and 86 of valve 81 are in communication and ports 83 and 146 and 147 and 148 of valve 84 are in communication.

As a result of such setting of the valves 81, 84 and 129, the fluid under pressure from the pump 14 forced into feed line 62, will pass through line 78 into port 79 of valve 81, through passageway 88, port 80, check valve 126, line 125, into junction 123. As a result, the pressure of the fluid applied to junction 123 will be indicated on pressure gauge 124. The fluid will flow from junction 123 through line 122 into port 121 to react against the piston 112 to move the latter and piston rod 113 to retracted position in booster cylinder 111. The fluid in chamber 117 of such cylinder will flow out of port 108, through line 107 into port 106 of relief valve 93 and thence through such valve, port 92, line 91, port 86, passageway 89, port 85, lines 105 and 104 to return line 29 and thence to the reservoir 11. As a result, the booster will be re-set for the pressure stroke.

Fluid will also flow from junction 123 through line 127, check valve 134 to the inlet 128 of valve 129. As such valve is closed, the fluid will flow through line 131 into port 132 of press 133, thereby forcing the piston 162 and plunger 163 downwardly until the latter engages the work. The fluid beneath the piston 162 will flow out of port 161 through line 159 into port 148 of valve 84 and thence through passageway 152, port 147, line 158 to return line 29 and thence to reservoir 11.

Thus, as a result of the above operation, the booster will be re-set, ready for the power stroke and the plunger 163 of the press 133 will be brought into engagement with the work.

When both the pistons 112 and 162 have reached the limit of their strokes, the pressure in line 62 will build up until a pressure of say 1000 p. s. i. is attained. At such time the relief valve 53 will function as previously described to actuate unloader valve 22 so that the pressure will be retained at 1000 p. s. i.

The next step in the operation is to provide a high pressure on piston 162 so that the plunger 163 will be moved with great force into contact with the work.

For this purpose, the handle 174 is moved to the right. As a result of the lost motion slot in handle 145, valve 129 is retained in closed position. By reason of the enlarged ends 153 of passageways 151 and 152, the ports 147, 148 and 83, 146 of valve 84 will remain connected and the ports 79, 86 and 80, 85 of valve 81 will be connected. As a result of the setting of the valves 81, 84 and 129, the fluid under pressure in feed line 62 will flow through line 78, port 79, passageway 88, port 86, line 91, port 92 of valve 93, through such valve, port 106, line 107 into port 108 of booster unit 109. As the pressure in line 107 is now illustratively 1000 p. s. i. by reason of the charged pressure accumulator 59, the force applied to the end 116 of piston 112 in booster cylinder 111 will be equal to the product of the pressure and the area of such end 116. Assuming that the area of end 116 is, say, seven times the area of the end 118 of piston 112, by the formula $$P = \frac{F}{A}$$

the pressure developed on the fluid in the chamber 119 of cylinder 106 to the right of the piston will be seven times the applied pressure in the chamber 117 of the cylinder 111 to the left of the piston, i. e., 7000 p. s. i. The fluid under such pressure of 7000 p. s. i. will flow from port 121 through line 122, to junction 123, to be read on pressure gauge 124. By reason of the check valve 126 in line 125 the fluid from line 122 will flow through line 127, through check valve 134 to the inlet 128 of valve 129. As such valve is in closed position, the fluid will flow through line 131 into port 132 of the press 133 to react against the piston 162 therein, thereby moving the plunger 163 against the work with a force of 7000 p. s. i. The fluid beneath piston 162 will flow out of port 161 through line 159, port 148, passageway 152, port 147, lines 158 and 29 to the reservoir 11.

Although the fluid is under a pressure of 1000 p. s. i. in lines 62, 82, port 83 of valve 84, passageway 151, port 146, line 157 into the outlet 156 of valve 129, as such valve is in closed position and retained in such position by the pressure of 7000 p. s. i. into inlet 122, the valve will remain closed.

By reason of the relief valve 93, the force exerted on plunger 163 may readily be adjusted to an amount below that caused by a pressure of 7000 p. s. i. Thus, the tension of spring 99 of valve 93 may be adjusted by turning plug 101 so that it requires a force produced by a pressure of say 900 p. s. i. against the piston 95 to effect movement thereof. Consequently as the pressure on the fluid in line 91 is 1000 p. s. i., due to the charged pressure accumulator 59, by reason of the fact that the area of the end 98 of piston 95 is greater than that of end 97, the tension on spring 99 will be overcome and piston 95 will move to provide communication between ports 92 and 102. As a result, fluid will flow from line 91, through ports 92 and 102, lines 104 and 29 to the reservoir 11 with resultant drop in the pressure in line 91 which will cause the piston 95 to move to cut off communication between ports 92 and 102. Although the fluid under a pressure of say 1000 p. s. i. will also flow from port 102 through line 105, port 85, passageway 89, port 80, check valve 126 and line 125 to junction 123, as the pressure at such junction is much greater than 1000 p. s. i., the latter pressure will have substantially no effect.

It is apparent therefore that the pressure applied to port 108 of booster unit 109 may be varied at will to an amount below 1000 p. s. i. and consequently the pressure in line 122 will be reduced correspondingly from 7000 p. s. i.

In the event that the booster piston 112 reaches the limit of its stroke with consequent reduction in the pressure applied to piston 162 of press 133 before a sufficient time has elapsed for completion of the operation on the work, the valve 81 may be rotated to restore the piston 117 of booster 109 to its retracted position and the valve 81 can then be turned to again apply high pressure from port 121 to line 122.

With the equipment above described, it is possible with a source of low pressure to provide an adjustable high pressure for actuating a hydraulic unit and the equipment permits utilization of the low pressure to set the press to its working position and to return it to standby position and the application of such high pressure when required for the work stroke.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention what I claim as new and desire to secure by Letters Patent of the United States is:

1. A hydraulic circuit comprising a fluid source, a pump connected to said fluid source, means to drive said pump, a feed line connected to the outlet of said pump, an unloader valve in said feed line, a pressure relief valve connected to said feed line and controlling said unloader valve to actuate the latter when the pressure in said feed line rises above a predetermined amount, a pressure booster unit comprising a cylinder having a piston slidably mounted therein with a piston rod affixed on one side thereof, the area of the piston on the piston rod side being smaller than the area of the piston on the other side thereof, a second pressure relief valve comprising a cylindrical casing, a piston slidable in said casing and of reduced diameter at its mid portion defining a pair of enlarged ends, one of said ends being of larger area than the other, a pair of ports in said casing, resilient means reacting against said piston to maintain said ports out of communication, a line connecting said feed line to one of the ports in said second pressure relief valve, a line connecting the other of said ports of said return line, said casing having a third port normally in communication with said first port, a line connecting said third port to said booster cylinder on the side of the piston opposed to its piston rod, a hydraulic unit comprising a cylinder having a piston slidably mounted therein, a line connected at one end to said booster cylinder on the piston rod side of the piston and at its other end to said hydraulic cylinder on one side of the piston therein, and a line connecting said hydraulic cylinder on the other side of the piston therein to said fluid source, whereby when the pressure of the fluid in the first port rises above a predetermined amount, based on the setting of the resilient means reacting against the piston of the second pressure relief valve, said piston will move to provide communication between the first and second ports thereby lowering the pressure applied to the piston in said booster cylinder.

2. A hydraulic circuit comprising a fluid source, a pump connected to said fluid source, means to drive said pump, a feed line connected to the outlet of said pump, an unloader valve in said feed line, a pressure relief valve connected to said feed line and controlling said unloader valve to actuate the latter when the pressure in said feed line rises above a predetermined amount, a pressure booster unit comprising a cylinder having a piston slidably mounted therein with a piston rod affixed on one side thereof, the area of the piston on the piston rod side being smaller than the area of the piston on the other side thereof, a second pressure relief valve, a line connecting said feed line through said second pressure relief valve to said booster cylinder on the side of the piston opposed to the piston rod, a hydraulic unit comprising a cylinder having a piston slidably mounted therein, a line connected at one end to said booster cylinder on the piston rod side of its piston and at its other end to the hydraulic unit cylinder on one side of the piston of the latter, a control valve and a two position selector valve which in one position connects said feed line to said hydraulic unit cylinder on the other side of its piston and connects said fluid source through said control valve to said hydraulic unit cylinder on said first-mentioned side of its piston and in its second position connects said hydraulic unit cylinder on said other side of its piston to said fluid source and connects said feed line to the outlet of said control valve.

References Cited in the file of this patent
UNITED STATES PATENTS

| | | |
|---|---|---|
| 2,043,453 | Vickers | June 9, 1936 |
| 2,088,859 | Huck | Aug. 3, 1937 |
| 2,351,872 | Parker | June 20, 1944 |
| 2,403,912 | Doll | July 16, 1946 |
| 2,562,764 | Bowers | July 31, 1951 |
| 2,612,756 | Peterson et al. | Oct. 7, 1952 |